United States Patent
Cohen et al.

(10) Patent No.: US 6,965,978 B2
(45) Date of Patent: Nov. 15, 2005

(54) MEMORY TRACKING TOOL

(75) Inventors: Shy Cohen, Bellevue, WA (US); John T. Spivey, Redmond, WA (US); Eyal Schwartz, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 285 days.

(21) Appl. No.: 10/438,671

(22) Filed: May 15, 2003

(65) Prior Publication Data

US 2004/0230763 A1    Nov. 18, 2004

(51) Int. Cl.[7] .................................. G06F 12/00
(52) U.S. Cl. ............................. 711/170; 710/15
(58) Field of Search .................. 711/170–173; 707/205; 710/8, 15

(56) References Cited

U.S. PATENT DOCUMENTS

| | | | | |
|---|---|---|---|---|
| 5,491,808 A | * | 2/1996 | Geist, Jr. | 711/100 |
| 5,999,933 A | * | 12/1999 | Mehta | 707/100 |
| 6,718,286 B2 | * | 4/2004 | Rivin et al. | 702/186 |
| 6,782,462 B2 | * | 8/2004 | Marion et al. | 711/170 |

OTHER PUBLICATIONS

Galen Hunt and Doug Brubacher, Detours: Binary Interception of Win32 Functions, Microsoft Research, http://research.microsoft.com/sn/detours, p. 1-9.

* cited by examiner

Primary Examiner—Christian P. Chace
Assistant Examiner—Matthew Bradley
(74) Attorney, Agent, or Firm—Shook, Hardy & Bacon, L.L.P.; Jesse J. Camach; Scott B. Strohm

(57) ABSTRACT

A method, medium, and computer-program product is provided for tracking memory-usage characteristics of an application. The invention includes a suite of tools to evaluate memory usage of uninstrumented binaries by tracking memory allocations, de-allocations, and in-memory-presence attributes at the module level. Memory-manipulation function calls (not limited to allocations and deallocations) are hijacked to code segments that annotate and log then-current memory characteristics. Processing is reverted back to its from-hijacked position and allowed to continue. In-memory presence of allocated memory and labels for certain points at time are tracked as well. The tracked data is logged so that algorithms can be run to extract desired information, which can be presented in various reports.

5 Claims, 7 Drawing Sheets

```
MODULE ATTRIBUTEALLOCATION(STACK S)
{
    S = REMOVEIGNORELIST(S, IGNORELIST);

SWITCH (MODE)
    {
        CASE ALL     : RETURN FINDWITHALL(S);
        CASE LIST    : RETURN FINDWITHLIST(S);
        CASE FILTER  : RETURN FINDWITHFILTER(S);
        CASE TRIGGER : RETURN FINDWITHTRIGGER(S);
    }
}

MODULE FINDWITHALL(STACK S)
{
    RETURN S.BOTTOM;
}

MODULE FINDWITHLIST(STACK S)
{
    FOREACH (MODULE M IN S) IF ( MODULELIST.CONTAINS(M) ) RETURN M;
    RETURN OTHERMODULES;
}
```

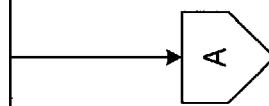

FIG. 6A.

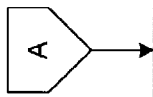

```
MODULE FINDWITHFILTER(STACK S)
{
    FOREACH (MODULE M IN S) IF ( MODULELIST.CONTAINS(M) ) RETURN S.BOTTOM;
    RETURN NULL;
}
MODULE FINDWITHTRIGGER(STACK S)
{
    WHILE (!S.ISEMPTY())
    {
        IF (S.BOTTOM != TRIGGERMODULE) S.REMOVEBOTTOM();
    }
    IF (!S.ISEMPTY()) S.REMOVEBOTTOM();        // <- REMOVE THE TRIGGER MODULE ITSELF
    IF (S.ISEMPTY()) RETURN NULL;
    ELSE RETURN S.BOTTOM;
}
STACK REMOVEIGNORELIST(STACK S)
{
    VIRTUALSTACK = NEW STACK();
    FOREACH (MODULE M IN S)
    {
        IF ( !(IGNORELIST.CONTAINS(M)) ) VIRTUALSTACK.ADD(M);
    }
    RETURN VIRTUALSTACK;
}
```

*FIG. 6B.*

MEMORY TRACKING TOOL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to application programming. More particularly, the present invention relates to the field of memory usage in a computing environment.

BACKGROUND OF THE INVENTION

Poor memory-usage characteristics are the bane of software applications. While an application runs on a computer or computing device, it uses a portion of the computer's physical memory. Physical memory is limited. Virtual memory is a conventional scheme employed in a computing environment whereby a computer's hard drive is made to appear to an application as available memory. When physical memory is exhausted, a memory manager swaps memory pages out of physical memory to the hard drive, and brings them back when they are needed again, potentially swapping other pages out in their stead. The event of fetching a missing page from disk is called a page fault. Data retrieval time from the hard drive is typically orders of magnitude greater than retrieval time from RAM (physical memory-random access memory). Accordingly, page swaps degrade an application's performance, especially when the application requires a large amount of memory, which must be synthetically created vis-à-vis page swaps.

An application's working set is a set of pages that the application has loaded into physical memory. Modem applications may have large memory footprints, which require persistent virtual-memory swaps and a large working set. Application performance could be enhanced if the memory footprint of an application could be reduced. Remedying page-fault problems can enhance the speed of computer applications.

Historically, however, evaluating an application's memory-usage characteristics and determining what modules allocated what memory has been difficult if not unavailable. No tools provided specificity with respect to what events caused certain memory manipulations, such as allocations and deallocations. Rather, one of the only metrics available may be that of memory to code. That is, total data usage can be calculated, it cannot be dissected to attribute pieces to the various system components. So, whereas total memory of an application—which typically includes many program modules—can be determined, memory usage attributable to individual modules cannot be likewise determined. This leads to an inability to adequately troubleshoot memory-usage issues.

There is a need for a tool set that can evaluate the memory-usage characteristics of a software application. Moreover, there is a need to be able to use the tool set on uninstrumented binary files.

SUMMARY OF THE INVENTION

The present invention generally relates to a development and evaluation tool set that tracks memory usage of a software application. The present invention offers several practical applications in the technical arts, not limited to depicting memory usage over time at the module level, tracking page faults, reporting memory consistent with its usage, highlighting important states and events, and assisting program design and development.

In one aspect, the present invention tracks various memory-allocation types, not limited to heap, virtual, memory-mapped files, page files, and other code-related allocations. The invention is a tool set that evaluates memory usage of an application by tracking, logging and providing various ways to analyze and report memory usage as it relates to both code and data. The tool tracks the memory usage of applications, including uninstrumented binaries, by tracking memory manipulations such as allocations, deallocations and in-physical-memory presence attributes.

The present invention tracks memory usage, analyze the tracked data, and presents intuitive reports that empower a developer or developing entity to isolate memory-related problems. With such knowledge, developers can shorten development periods and create higher quality applications. Tracking is done by rerouting memory-manipulation function calls, examining memory usage at various code points, and annotating different points during the program's run. The tracking data can then be output to a log record, which is analyzed to determine the memory behavior of the application. The results produced in the analysis can be tabled, charted, examined, and/or logged for comparison with future runs of the tool.

Embodied algorithms are disclosed that analyze the tracked data and enable it to be presented intuitively. Core modules that are necessarily responsible for memory allocations can be ignored, revealing a more precise representation of memory usage. Depictions can be made of modules at the tope of a memory stack. This depiction can be narrowed by including a list of only certain modules. The present invention can also count allocation towards the module whose address is at the stack's top when a module from a module list is on the stack. A module of interest can be so designated. Other modules that contribute to allocations resulting from the module of interest can be depicted.

BRIEF DESCRIPTION OF THE SEVERAL VIEWS OF THE DRAWINGS

The present invention is described in detail below with reference to the attached drawing figures, wherein:

FIGS. 6A–6B are exemplary representations of pseudocode for carrying out functionality offered by the present invention.

DETAILED DESCRIPTION OF THE INVENTION

The present invention provides a method and suite of tools that allow tracking of memory usage of uninstrumented binaries by tracking memory allocations, de-allocations, and in-memory presence. In a preferred embodiment, a memory usage is tracked, analyzed, and reported. An exemplary operating environment for the present invention is described below.

Exemplary Operating Environment

Figure 1:
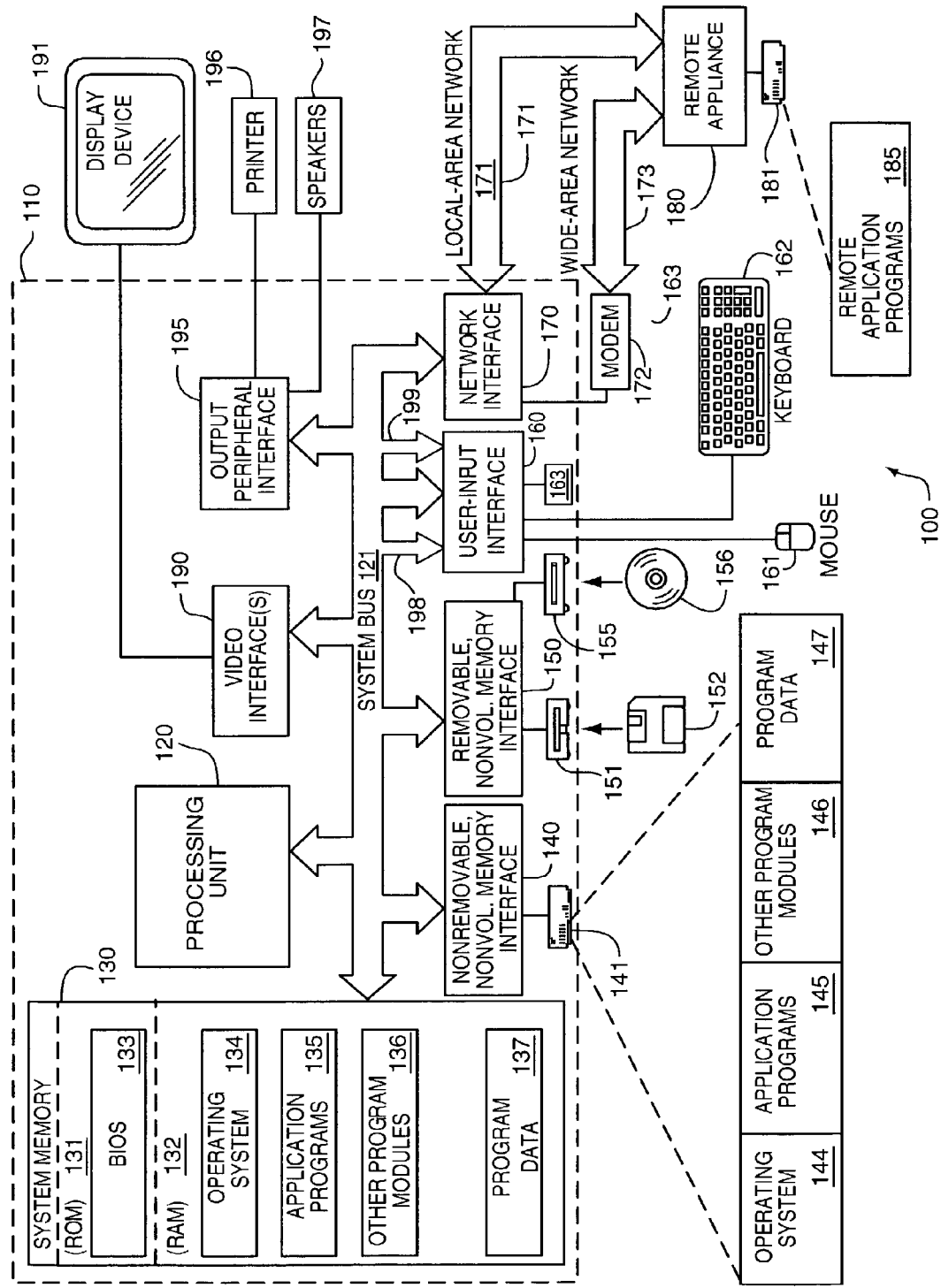
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing-system environment 100 is only one example of a suitable computing environment and is not intended to suggest any limitation as to the scope of use or functionality of the invention. Neither should the computing-environment 100 be interpreted as having any dependency or requirement relating to any one or combination of components illustrated in the exemplary operating environment 100.

The invention may be described in the general context of computer code or computer-executable instructions, such as program modules, being executed by a computer. Generally, program modules including routines, programs, objects, components, data structures, etc., refer to code that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed computing environments where tasks are performed by remote-processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer storage media and communication media. Examples of computer storage media include, but are not limited to, Random Access Memory (RAM); Read Only Memory (ROM); electronically erasable programmable read-only memory (EEPROM); flash memory or other memory technology; CD-ROM, digital versatile disks (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A basic input/output system 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer storage media that can be used in the exemplary operating environment include, but are not limited to, magnetic tape cassettes, flash memory units, digital versatile discs, digital video tape, solid state RAM, solid state ROM, and the like. The hard disk drive 141 is typically connected to the system bus 121 through a non-removable memory interface such as interface 140. Magnetic disk drive 151 and optical disc drive 155 are typically connected to the system bus 121 by a removable memory interface, such as interface 150.

The drives and their associated computer storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; or a wireless transceiver 163. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 139A port, or a universal serial bus (USB).

A display device 191 is also connected to the system bus 121 via an interface, such as a video interface 190. Video interface 190 could also accept an incoming video signal. Display device 191 can be any device to display the output of computer 110 not limited to a monitor, an LCD screen, a TFT screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180.

The remote computer 180 may be a personal computer and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which can be stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

Memory Evaluation

As previously mentioned, the present invention may be described in the general context of computer-executable instructions such as program modules executed by one or more computers or other devices. The functionality of the program modules may be combined or distributed as desired in various embodiments to evaluate the memory-usage characteristics of an application.

Figure 2:
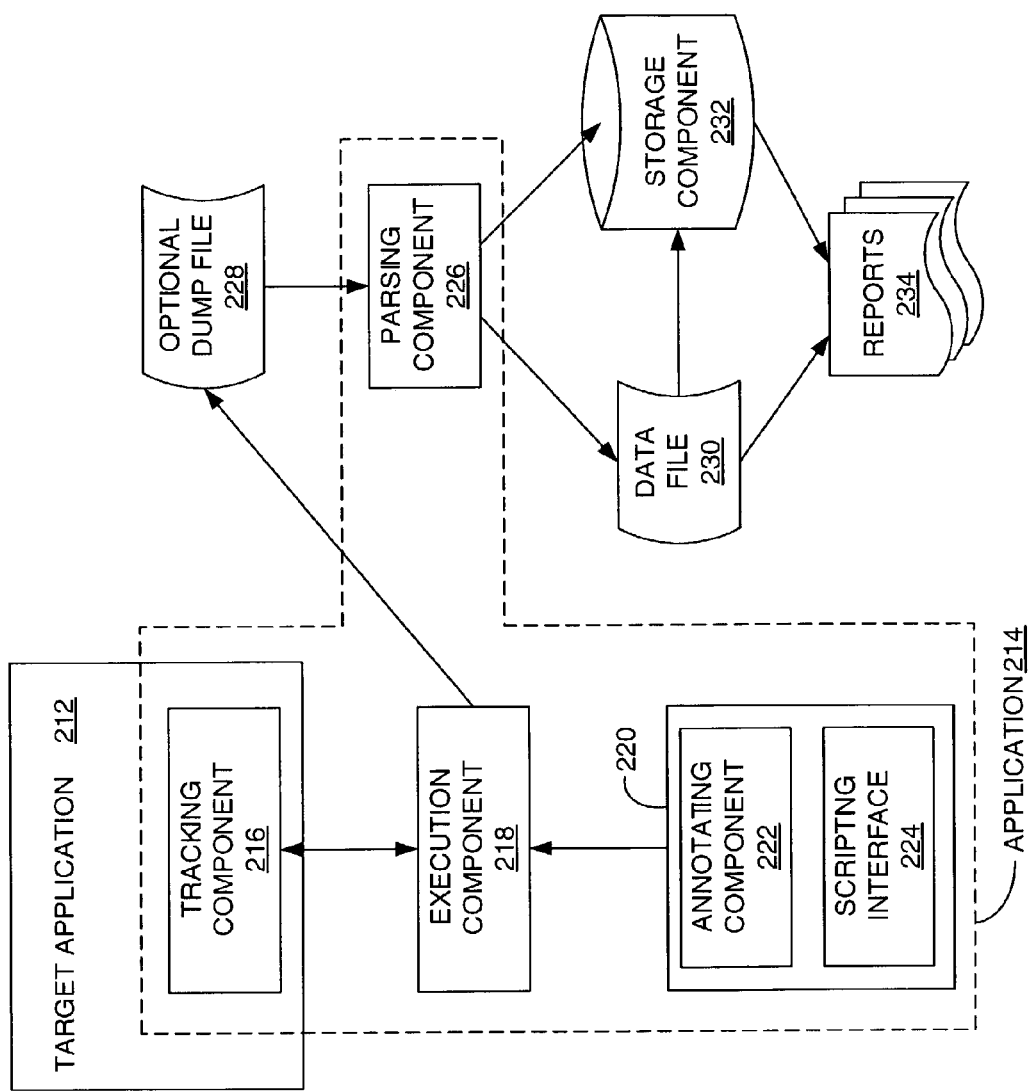
FIG. 2 is block diagram depicting an exemplary embodiment of subcomponents of the present invention.

FIG. 2 depicts an illustrative implementation of the present invention in a computing environment. In FIG. 2, memory allocation of a target application 212 could be evaluated using the present invention, which includes application 214. Application 214 can take a variety of forms to evaluate memory usage, as would be appreciated by one skilled in the art. A skilled programmer may readily appreciate alternatives to the various subcomponents of application 214 without departing from the spirit and scope of the present invention.

In a preferred embodiment, application 214 includes five components: a tracking component 216, an execution component 218, a controlling component 220—which, in a preferred embodiment, includes an annotating component 222 and an optional scripting interface 224—and a parsing component 226. These subcomponents of application 214 work together to produce a dump file 228, which can be parsed by parsing component 226. The resultant data can be used in a data file 230 or stored in a storage component 232. From these data outputs, a variety of reports 234 can be generated.

Target application 212 is an application whose memory-usage characteristics are to be evaluated by the present invention. An advantage offered by the present invention is that target application 212 can be used in conjunction with an uninstrumented binary file. Instrumentation is a means of tapping into the behavior of an application. The present invention enables analysis of target application 212 without requiring compile or link-time changes to the binary code. Profiling and analysis tools introduce the tracking functionality into an application such as target application 212. In one embodiment, this can be accomplished using programmatic hooks—points in an application's code to which analysis code can be attached.

Some tools add instrumentation hooks at the source level, some at compile time, some at link time, and some operate on the linked files. Instrumented binaries are files that have the described hooks within them. Uninstrumented binaries are binaries that do not have these hooks in them. Here, the present invention can be practiced on uninstrumented binaries, offering a great advantage by obviating a need for special preprocessing or prepping of the code of target application 212.

Tracking component 216, in a preferred embodiment, is a set of instructions that allows target application 212 to have its memory usage tracked. In a preferred embodiment, tracking component 216 is a DLL module that allows target application 212 to interact with the other modules of application 214. As will be explained in greater detail below with reference to a method for carrying out the present invention, tracking memory allocations (including deallocations) of target application 212 can be accomplished by rerouting function calls to other functions that log memory attributes.

Execution component 218 communicates with tracking component 216 and controlling component 220 to help direct the examination of memory-usage characteristics of target application 212. In a preferred embodiment, execution component 218 facilitates stack walking to find the call stack associated with various memory allocations. Stack walking is a process of examining a thread's call stack to determine how target application 212 is using memory at a specific execution points or intervals. The process of tracking allocations uses memory resources. Execution component 218 tracks allocation data outside of the memory space associated with target application 212, thus not affecting the application's memory usage. When asked, execution component 218 outputs to a file, such as dump file 228, all of the requested information related to memory allocations, deallocations, and page faults that occurred during the run.

Annotation component 222 prompts execution component 218 to make snap shots of various memory-usage characteristics during the execution of target application 212. These snap shots can include labels related to specific points in time with corresponding text strings that can be subsequently evaluated and dumped to dump file 228. Memory-usage data is outputted to dump file 228 along with corresponding labels and/or time stamps. This raw data can later be manipulated to provide an array of useful reports that enable application developers to improve the performance of target application 212.

Scripting interface 224 is an optional scriptable object that allows automated test scripts to communicate with execution component 218. Scripting interface 224 also prompts execution component 218 to mark snap shots and generate dump files in a manner similar to that of annotating component 222. Test scripts are used in application development to automate the testing of the application and ensure that it operates as expected. It is desirable that, to the extent possible, testing be automated. In a preferred embodiment, scripting interface 224 uses an IDispatch-able interface to communicate with execution component 218, but those skilled in the art may appreciate available alternative means that, by accomplishing similar functionally, are contemplated within the scope of the claims.

Parsing component 226 parses dump file 228 into a format more easily usable by a reporting program. For example, in a preferred embodiment, parsing component 226 is a Perl script that outputs a CSV (comma separated variable) file, which can then be read by a spreadsheet program to produce reports 234. The data file 230 can also be stored in storage component 232 so as to be compared to subsequent execution runs in the future.

As previously mentioned, the present invention allows the tracking of memory usage of uninstrumented binaries including tracking memory allocations, deallocations and in memory attributes. The present invention seeks to minimize the working set of target application 212. The "working set" is a term known in the art of computer programming and refers to that portion of physical memory that is being used by an application such as target application 212.

Figure 3:
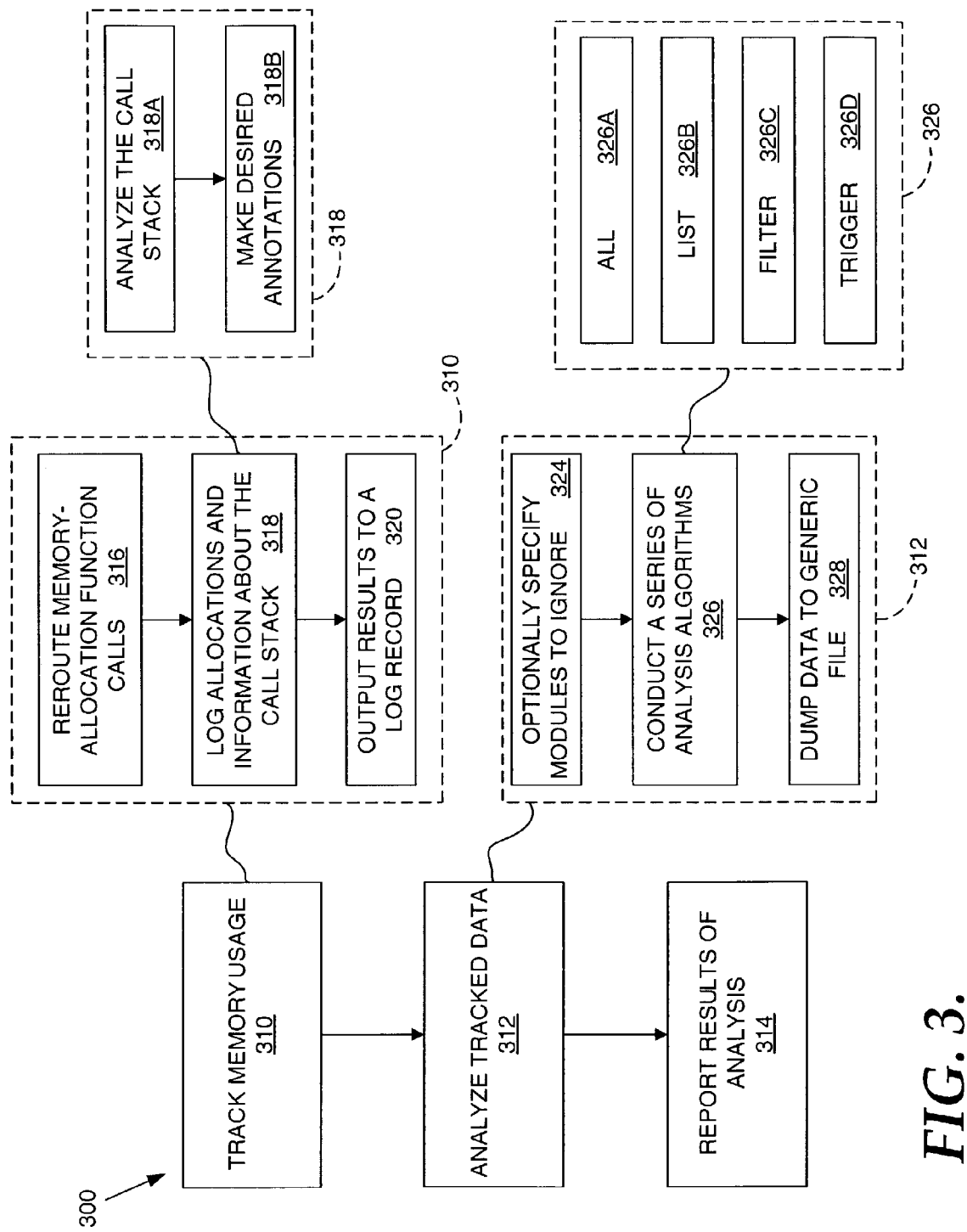
FIG. 3 is a flow diagram illustrating the functionality carried out by the present invention.

Turning now to FIG. 3 a preferred process executed by the present invention is referenced generally by the numeral 300. Process 300 involves the following steps: Track memory usage at a step 310; analyze tracked data at a step 312; and report the results of the analysis at a step 314. Those skilled in the art will appreciate a variety of ways to carry out the functionality of process 300. However, preferred embodiments for realizing the steps of process 300 are included below.

Tracking

Tracking is accomplished by rerouting calls originally targeted for memory allocation and deallocation functions of target application 212. When target application 212 calls these functions, the calls are rerouted from an entry point of the respective calls to locations within application 214. Application 214 can then analyze the call stack and log various attributes of the call stack along with additional information about the call for subsequent analysis. The intercepted, or hijacked, function is then rerouted back to a point just after the entry point from which it was intercepted. This procedure does not change the behavior of the application except for slowing it down during the testing phase.

Once the application run is complete (or if specified to do so while the application is running), application 214 can output the tracked operations to a log, such as dump file 228. The log does not have to be in a file. It can be in any sharable form, including, but not limited to, shared memory, a named pipe, private memory with a network connection to access it, or a database. "Dump file" will be used herein for simplicity but is not to interpreted as limiting to a "file" per se. This dump file 228 can then be used in the analysis phase. Thus, an exemplary process for tracking memory usage using the present invention would include rerouting memory-allocation function calls at a step 316.

One method for rerouting the memory-allocation function calls is to use technology known as detours. Thus, as used herein, "detours" has a special meaning that may be inconsistent with its plain meaning. Detours is a technology for in-memory binary level patching of applications. Detours intercept certain functions by rewriting target function images. Third-party developers often do not have access to the source code of an application, for example target application 212. Detours offer a way to preserve the uninstrumented target function (callable through a trampoline function) as a subroutine for use by the instrumentation. Accordingly, the present invention can be practiced on binary files. More information regarding detours and their implementation can be retrieved from as well as in a paper entitled "Detours: Binary Interception of WIN32 Functions," authored by Gaylan Hunt and Doug Brubacher. The contents of both references are incorporated herein by reference.

Figure 4:
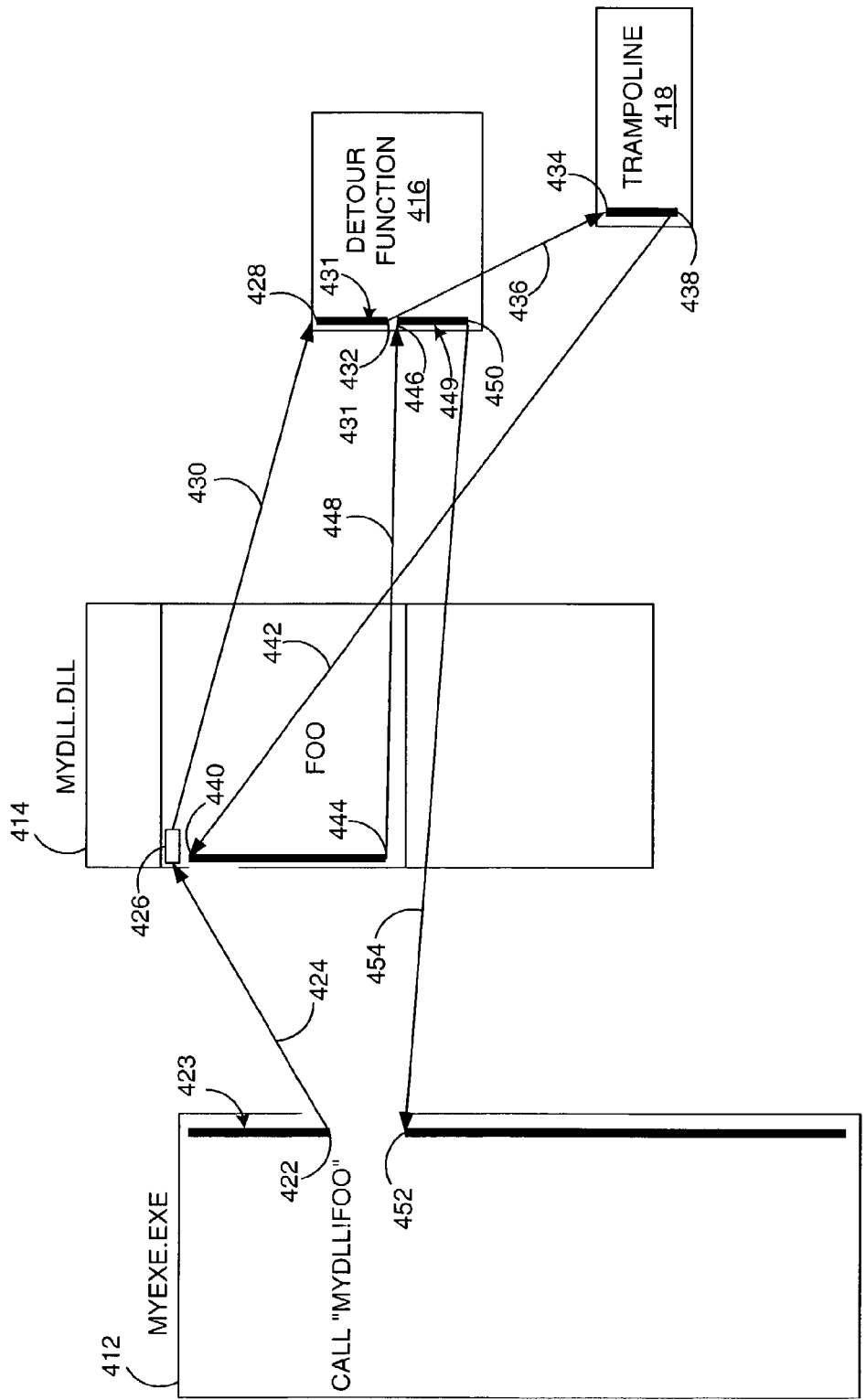
FIG. 4 is a code-flow diagram depicting an embodiment for implementing the present invention.

An exemplary illustration of the process employed by the present invention is included with reference to FIG. 4. An exemplary executable module 412 is depicted along with an exemplary DLL file 414, a detour function 416, and a trampoline function 418. In this example, memory-usage characteristics of an executable module 412 ("MYEXE.EXE") are desired. Executable module 412, like many computer-program products, are actually portions of an entire application. The application often includes other files to run, most commonly DLL files. Certain calls to certain functions manipulate the memory usage of target application 212. Proceeding with this simplistic example, exemplary DLL file 414 (MYDLL.DLL) is a module that is used by the MYEXE.EXE file. To evaluate the memory-usage characteristics of MYEXE.EXE, a single function call will be tracked: to a function ("FOO") within the MYDLL.DLL module.

In this example, a function call is made from executable file 412 to "MYDLL!FOO" at position 422 of code segment 423. Processing continues along path 424 to a small code segment 426, which reroutes the function to a detour entry point 428 via path 430. In a typical embodiment, code segment 426 is a single machine instruction and enables an application such as target application 212 to have its memory allocations tracked. The call to function "FOO" has been hijacked.

The detour function can be used in conjunction with application 214 to take a snap shot or perform other processing of the call stack associated with the memory call function during steps 318A and 318B. Thus, code segment 431 can be used to facilitate examination of the call stack at this point. Application 214 can interrogate the memory regarding MYEXE.EXE's memory usage. As previously mentioned, annotating component 222 and scripting interface 224 can takes snapshots of the memory. The call-stack data can be retrieved in raw format to allow subsequent stackwalking, or the stack can be analyzed in real time. Preferably, the data is simply tracked and logged at this time to speed up the tracking process and enable executable 412 to complete its run quickly. In a preferred embodiment, symbols are used to allow greater accuracy in walking the stack.

Processing continues upon leaving detour function 416 at an exit point 432 to trampoline function 418. The trampoline function 418 is entered at entry point 434 and exits at point 438 to return functionality along path 442 to the reentry point 440, which corresponds to the initial entry point of the "FOO" function. Thus, the original functionality of the memory-allocation function call is preserved and is allowed to complete.

Processing continues through to code point 444. From this point 444, execution reenters detour function 416 at entry point 446 via path 448. Again, a snap shot and other memory characteristics can be gathered or initiated via code segment 449. Processing exits detour function 416 at point 450 and returns to code point 452 along path 454. Code point 452 is the original reentry path of the function call to "MYDLL-!FOO."

Absent the present invention, processing would have traveled from point 422 along path 424 to point 426, entering the exemplary DLL file 414. The "FOO" function would have been executed by processing the code from code point 440 to code point 444. Processing would have then returned to exemplary executable file 412 at point 452. Returning to the process and FIG. 3, the data gathered during the above process described in FIG. 4 is outputted to a log record at step 320. This log record is the dump file 228 and typically contains a great deal of data.

During the memory-tracking process 310, many aspects of an application's memory usage can be logged, including the working set, file maps, heap usage, used modules, page-map usage, page swaps, and virtual memory. To obtain targeted data, the tracking process can be conducted in various embodiments. In one embodiment, memory characteristics more specific to an application's physical-memory presence can be gathered.

Analysis

The next process carried out by the present invention is to analyze the tracked data at a step 312. Parsing component 226 can parse dump file 228 so that analysis can be performed on the data in dump file 228. In a preferred embodiment a Perl script is used to analyze the memory allocation of target application 212 at the module level over time. Scripting can expose memory-usage characteristics at specific times during the execution of target application 212. The analysis phase 312 helps determine the memory behavior of target application 212.

Prior to conducting a series of analysis algorithms at a step 326, a list of modules can be specified to be ignored at a step 324. Defining a list of modules that should be excluded during the analysis phase is important because certain system modules will always be attributed to making memory allocations. The ignore list instructs all of the attribution algorithms to ignore the module(s) specified in that list. Those modules do not appear on the stack as far as the algorithms are concerned. Accordingly, distinguishments can be made between an actual (or physical) stack and a virtual stack. These concepts can be briefly explored with reference to FIG. 5.

Figure 5:
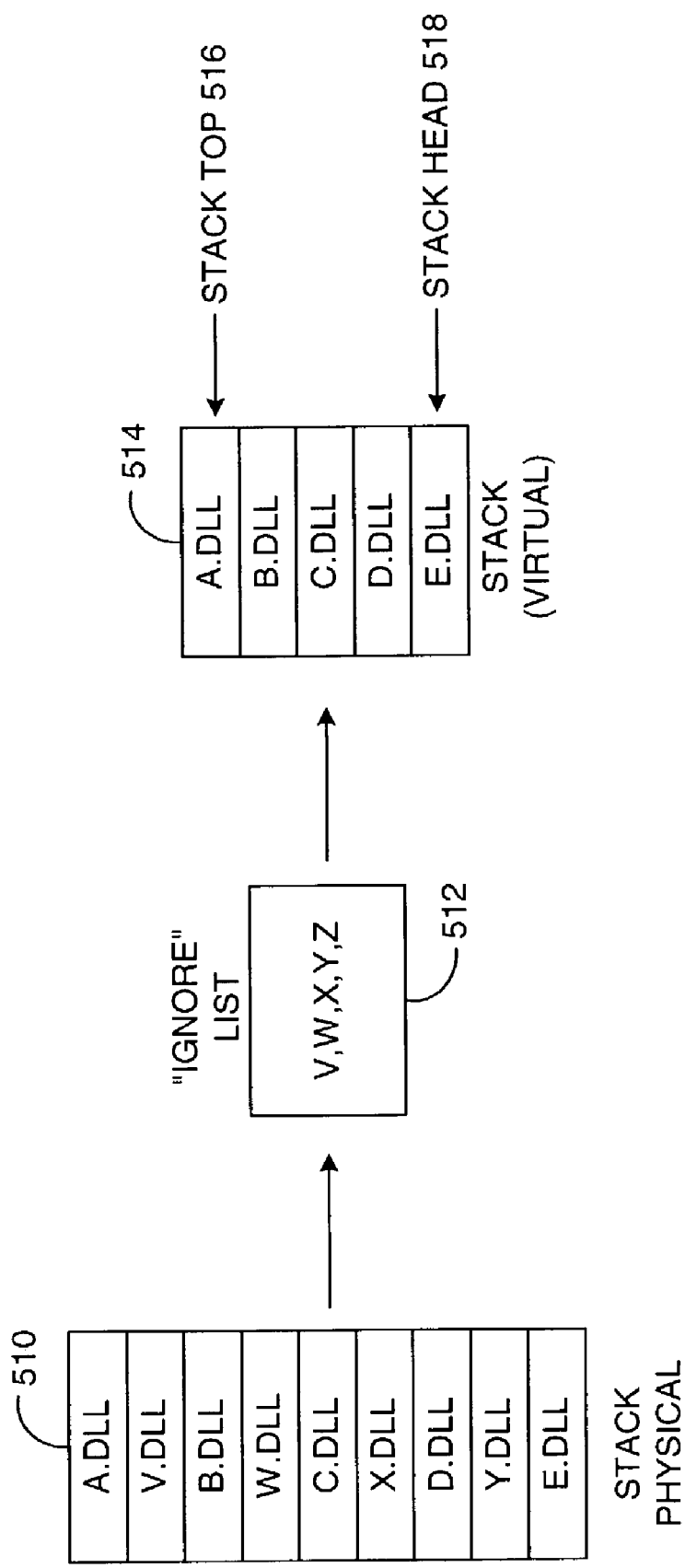
FIG. 5 presents an illustrative physical memory stack and virtual stack.

FIG. 5 represents a physical stack 510, an "Ignore list" 512, and a virtual stack 514, which includes a stack top 516 and a stack head 518. Stacks 510 and 514 include a variety of modules. The module that was allocated to the memory in the most distant past is "E.DLL," at the stack head 518. "A.DLL" is at the stack top 516. "Ignore list" 512 is included denoting that modules V, W, X, Y, Z are to be excluded from various operations. One possible reason for exclusion of these modules is because they operate at the system level and may obscure or dominate results and reports subsequently created. Accordingly, application 214 may see the stack as virtual stack 514, which "includes" only modules A, B, C, D and E.

Returning to FIG. 3, at least four algorithms are depicted that can be used to analyze the data in dump file 228: an "all" algorithm 326A, a "list" algorithm 326B, a "trigger" algorithm 236C, and a "filter" algorithm 326D. The aforementioned names attributed to the various analysis modes are not to be construed as terms of art. That is, the functionality accomplished by the various modes are aspects of the present invention, rather than labels. Accordingly, the following description of the various analysis modes may be roses called by many names but accomplish the functionality captured by the claims below.

When running a process in "all" mode 326A, application 214 counts current allocations toward the module whose address shows at the stacks top. This mode is useful for trying to understand what amount of memory was allocated by the module at the top of the stack. The last module to allocate memory gets credit for allocating the memory in that stack. If, however, the module at the top of the stack is in the ignore list 512, then memory will be attributed to the next nonignored module in the stack. Thus, the "all" mode 326A provides a per-module report of memory usage over time for memory allocations made by a module found at the top of the stack, which in this example is "A.DLL." Thus "all" mode 326A logically presents the following statement: "<name of module at virtual stack's top> caused <size> bytes of memory to be allocated."

Consider a situation where module E calls module D, which calls C, which calls B, which calls A; and this collective calling results consumes 1 MB of memory. Module A would be at the stack's top 516. If a report 234 is run in "all" mode 326A, then module A would be charged for allocating 1 MB of memory.

"List" mode 326B is used when certain specific modules are of interest. An analysis in "list" mode receives a list of modules and attributes allocations for the first module from the module list, or an "other modules" bucket if none is found. "List" mode 326B provides per-module reporting of memory usage over time for allocations made by modules in a module list, or in other modules which those modules called. "List" mode 326B provides information regarding one or more modules of interest that were involved in allocating a certain amount of memory. Running "list" mode 326B can be used to make a statement such as: "<name of module in module list> caused <size> of bytes of memory to be allowed."

The module list is similar to a watch list in that it identifies which modules are of interest for tracking purposes. In "list" mode 326B, the present invention begins at the stack's top and compares the module at the stack's top with the modules listed in the module list. The modules are compared based on memory addresses by matching the address on the stack with all the ranges for all the specified modules and identifying the one that fits the most. If the module at the stack's top is contained in the module list, the present invention counts the allocation towards this module. If the module does not exist in the module list, the present invention moves down the stack and attempts to find a match again. If no module from the module list is encountered in the stack, the allocation is counted to an "other modules" bucket.

Consider a module list that includes {B, D}. The present invention will attempt to allocate memory to the modules in the module list if they exist in the stack 514. The stack 514 contains module B, which is the module closest to the virtual stack's top 516 that also exists in the module list {B, D}. Thus, 1 MB of memory will be attributed to B.DLL.

"Filter" mode 326C can be used to determine how a component uses memory. A component's module is listed in a module listing. Whenever one of the listed modules appears in a stack, memory will be allocated to the module at the top of that stack. In this way, the component of interest that uses memory can be seen. "Filter" mode 326C can be used to make statements such as: "<name of module at top of virtual stack> allocated <size> bytes of memory due to a request from a module in the module list>."

"Filter" mode 326C counts current allocation towards the module whose address shows at the stack's top, but only if one of the modules specified in a module list is somewhere down the call stack. If no modules exist in the call stack that are listed in the module list, then the memory allocated for that stack gets placed in the "other modules" bucket. For example, consider again the virtual stack 514 of FIG. 5 and a module list that includes {B, D}. Module A is at the stack's top 516. In this mode, the present invention will attribute module A with allocating 1.0 MB of memory because the stack 514 contains the module B, which also exists in the module list.

"Trigger" mode 326D, can be used to create a report that details which modules allocate memory using the trigger module. The trigger mode is useful for determining modules of interest that are using the module at the top of the stack. "Trigger" mode 326D runs from a module-investigation algorithm. The question this algorithm tries to answer is: "which modules contribute to allocations done by the module X?" In one aspect, "trigger" mode 326D is the reverse of "filter" mode 326 C in that "filter" examines the effect a module exerts on the system and "trigger" retrieves the effect the system puts on a particular component.

The "trigger" algorithm takes "trigger" module, and uses the "list" algorithm to find the "trigger" on the stack. If the trigger is not found, the stack is ignored. The present invention then attributes memory to the next module (similar to "all"), or the "other modules" bucket, if none is found. Only allocations that end up in the "interesting" component are counted, enabling one to retrieve a good picture of how a certain component is being used.

Once the "trigger" is found, all the modules "above" and including the "trigger" module are ignored, creating a "shorter" virtual stack. "Trigger" mode 326D can be used to make statements such as: "<name of module in module list> module caused the module at the top of the virtual stack: <name of trigger module> to allocate <size> bytes of memory." Or put another way: "<module at top of virtual stack> caused the trigger <trigger module> to allocate <size> bytes of memory."

The present invention performs the "all" algorithm on a stack. To be a valid trigger, the module that is selected while using the "all" algorithm (the module at the stack top 516) must be the trigger module. All stacks that do not match this condition are ignored. If the condition is met, the next watched module is allocated the memory for that stack. If no "watched" module exists in the stack (other than the trigger), then the memory allocated within that stack is placed in the "other modules" bucket.

To illustrate, again consider virtual stack 514 of FIG. 5, having module list {E, D} where module B is a designated trigger. Running the "all" algorithm on this stack will result in module B being identified. Since B is the trigger, the present invention will attempt to attribute the memory allocated to a module that called B and is also in the modules list {E, D}. Since D called C and C called B, and D is in the module list, 1.0 MB of memory will be attributed to D.

Pseudocode for the algorithms that enable the present invention to operate in the aforementioned modes are provided in FIGS. 6A–6B. Those of ordinary skill in the art will appreciate that the pseudocode can be fleshed out and actually implemented in a variety of ways using a variety of languages and/or application-development tools.

Reporting

The last stage of the present invention is the reporting stage, whereby reports 234 are generated from either the dump file 228 or the data file 230 parsed by parsing component 226. In this stage, the results produced in the analysis step 312 are charted and/or logged for comparison with future runs. Those skilled in the art will appreciate the vast array of data depictions that can be provided given a source file such as data file 230, which in a preferred embodiment is a CSV file.

A first exemplary report 234 could include a chart showing per module memory usage over time. This chart could be tailored according to the algorithm and accounting method used. This chart can be read by a user to examine the behavior of target application 212. Another exemplary report 234 could include a chart comparing the same script over time thereby depicting improvements or regressions in individual steps.

As previously mentioned automatic scripts can be used via scripting interface 224. The results of these scripts can be graphed side by side on the same chart to determine whether the applications memory-usage characteristics are improving. Another exemplary report 234 could include a chart that examines peak allocation of multiple scenarios over time. This chart could be used to check for regressions at a higher level of abstraction.

Reports 234 are not constrained to graphical depictions. An exemplary non-chart report includes a report delineating stacks by number of appearance as well as a most-called-functions report. Those skilled in the art will appreciate that the reporting system is open and has the ability to produce a vast array of types and charts as needed. Preferably the results are exported in a Web-type format such that the reports 234 are viewable in a Web browser such as INTERNET EXPLORER® made by the Microsoft Corporation of Redmond, Wash.

In one embodiment, a conventional spreadsheet program can read data file 230 to produce the aforementioned charts. Charts can be used to readily isolate problems associated with target application 212. One of the main problems targeted to be resolved by the present invention are page faults. For instance, a user could run the all algorithm to produce a chart depicting memory allocations for an array of modules. It could then be readily observed that a particular module is making unnecessary, taxing memory allocations. To determine the cause of these taxing memory allocations, a user (or program) could then employ the trigger mode 326D to see what is causing the allocations. A user may determine which modules whose memory usage should be further contained after determining the specific modules responsible for making the allocations.

The applications of the present invention abound. The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and subcombinations are of utility and may be employed without reference to other features and subcombinations and are contemplated and within the scope of the claims.

The invention claimed is:

1. A memory-tracking application that evaluates memory usage of a target application that may include a plurality of modules, said memory-tracking application comprising:
    a tracking component that enables said target application to have its memory usage tracked and wherein said tracking component enables tracking of uninstrumented binary code;
    a controlling component that creates log of said memory usage;
    an execution component that communicates with said tracking component and said controlling component to direct an examination of memory-usage characteristics of said target application; and
    a parsing component that parses said log to create memory-usage reports.

2. The memory-tracking application of claim 1, wherein tracking said uninstrumented binary code comprises tracking memory manipulations.

3. The memory-tracking application of claim 2, wherein memory manipulations include memory allocations, deallocations and in-physical-memory presence attributes.

4. The memory-tracking application of claim 1, wherein said controlling component comprises an annotating component that provides labels related to specific execution points.

5. The memory-tracking application of claim 1, wherein said reports comprise one or more of the following:
    a per-module report of memory usage at certain point in time for memory allocations made by or on behalf of one or more of said modules;
    a per-module report of memory usage over time for memory allocations made by or on behalf of one or more of said modules;
    a first report depicting one or more stacks by number of appearances;
    a second report depicting a hierarchy of functions ordered by frequency of calls that manipulate memory;
    a third report depicting memory-usage behavior of said application; and
    a peak-allocation report.

* * * * *